Dec. 8, 1931.  L. D. SOUBIER  1,835,351
GLASSWARE FORMING MACHINE
Filed Oct. 20, 1927  7 Sheets-Sheet 1
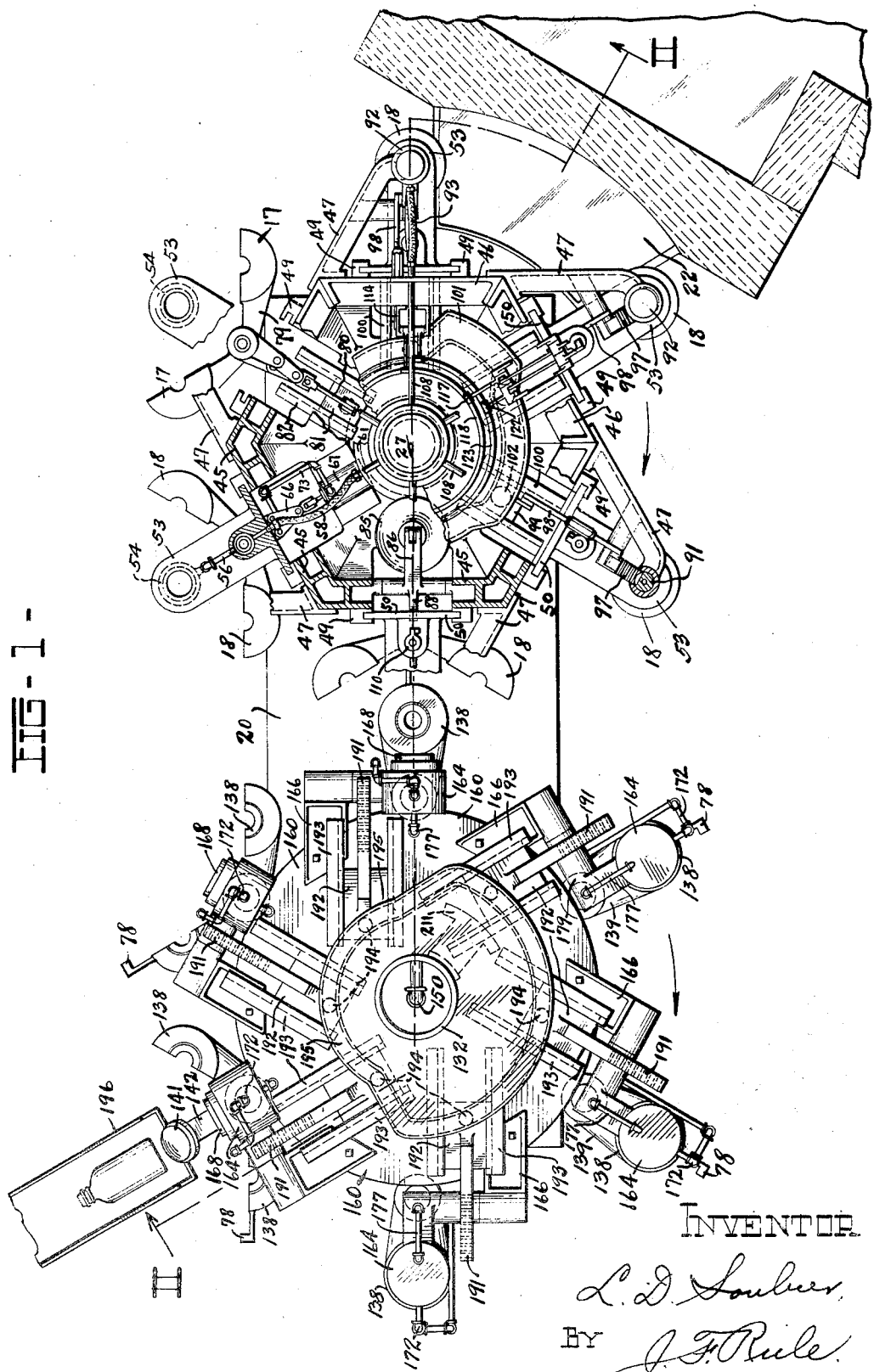
FIG-1-
INVENTOR
L. D. Soubier
By J. F. Rule
ATTY

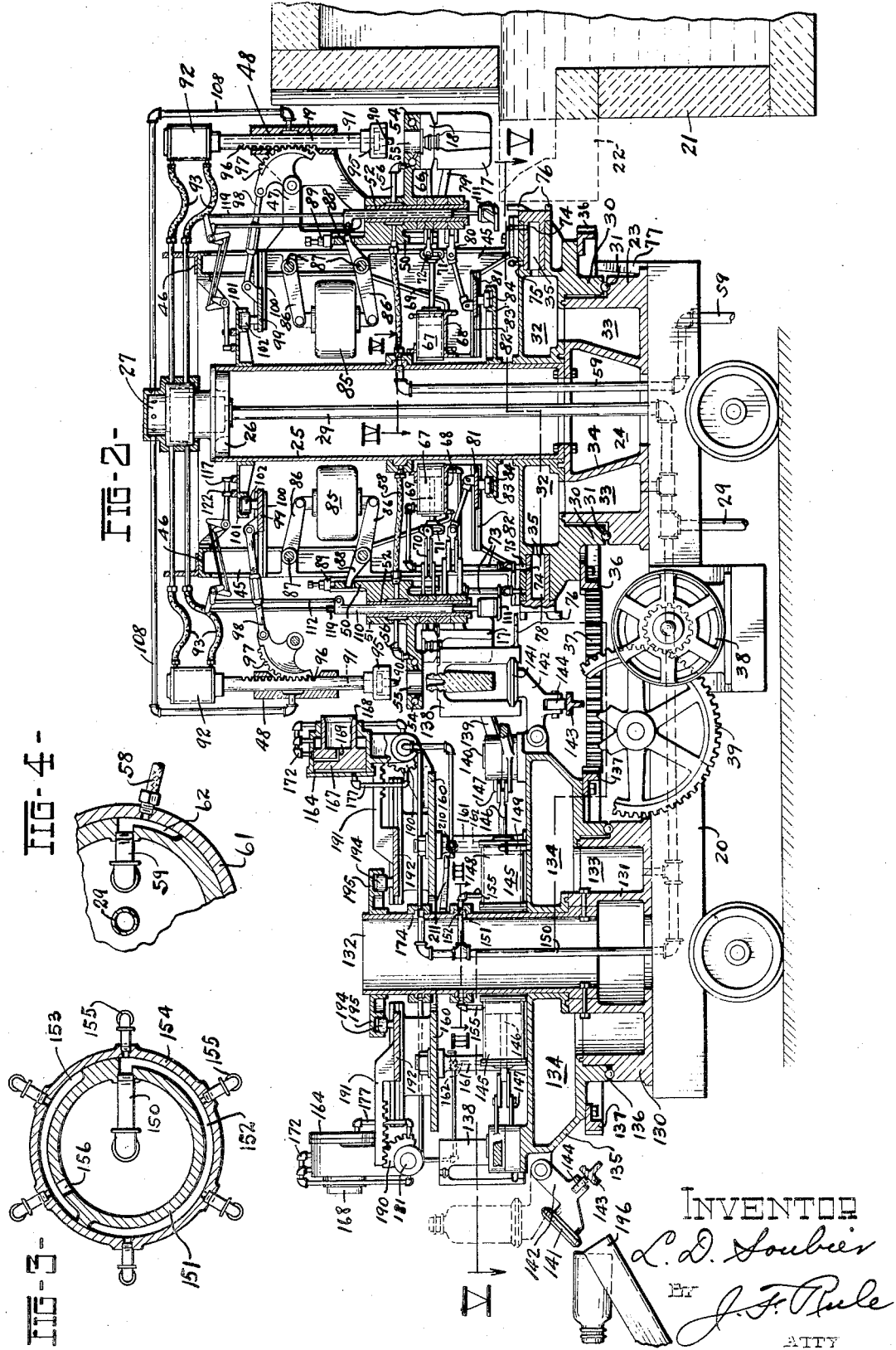

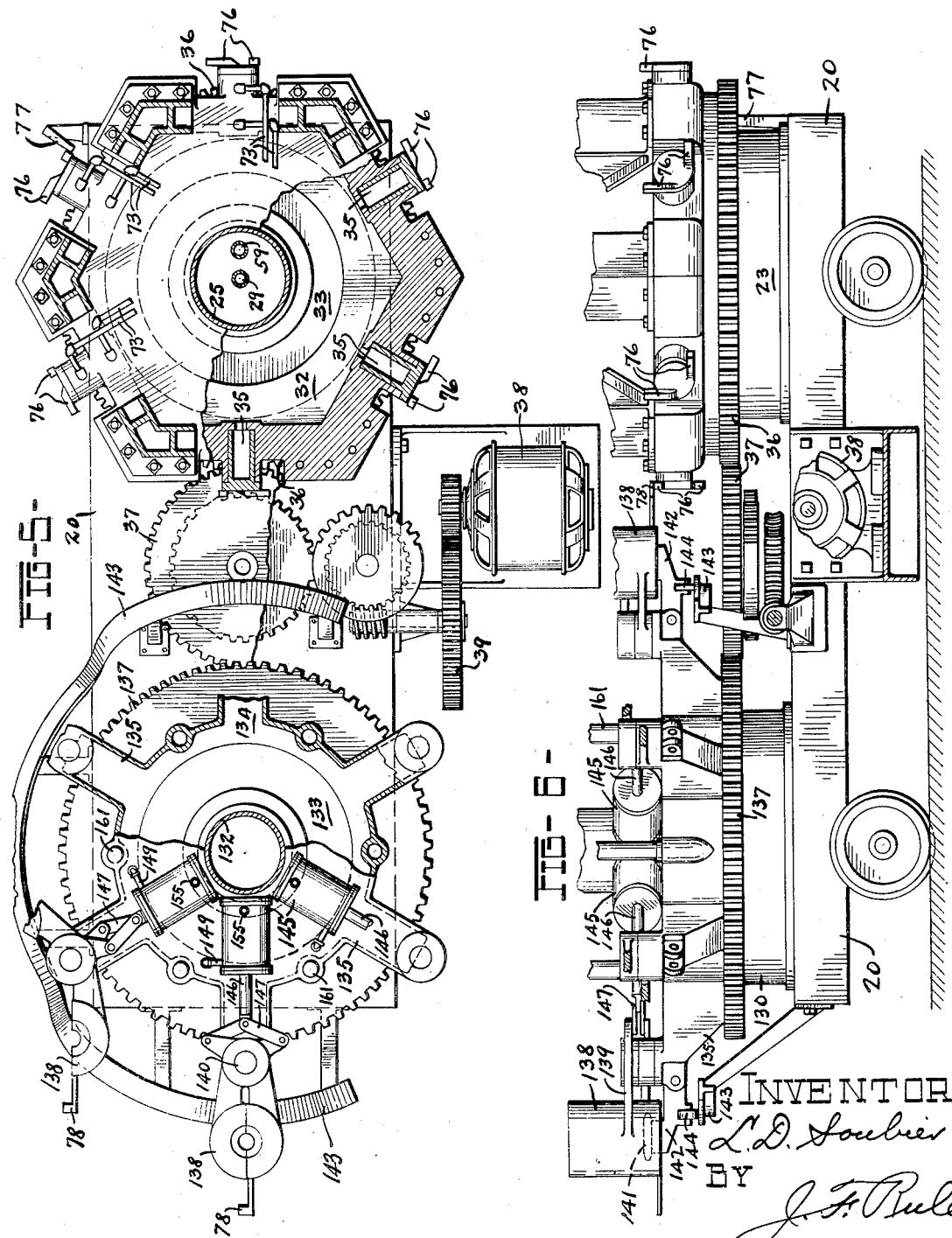

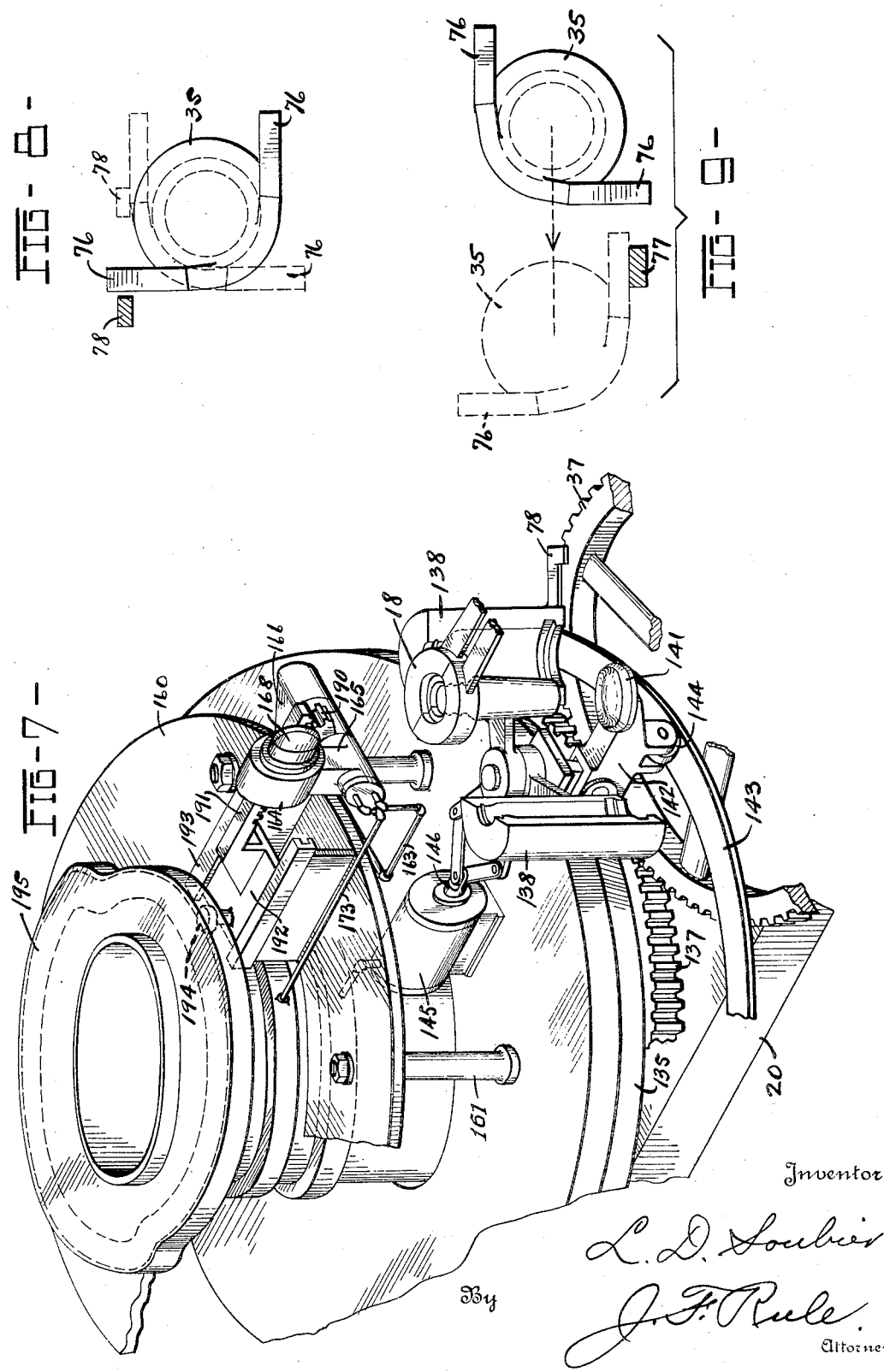

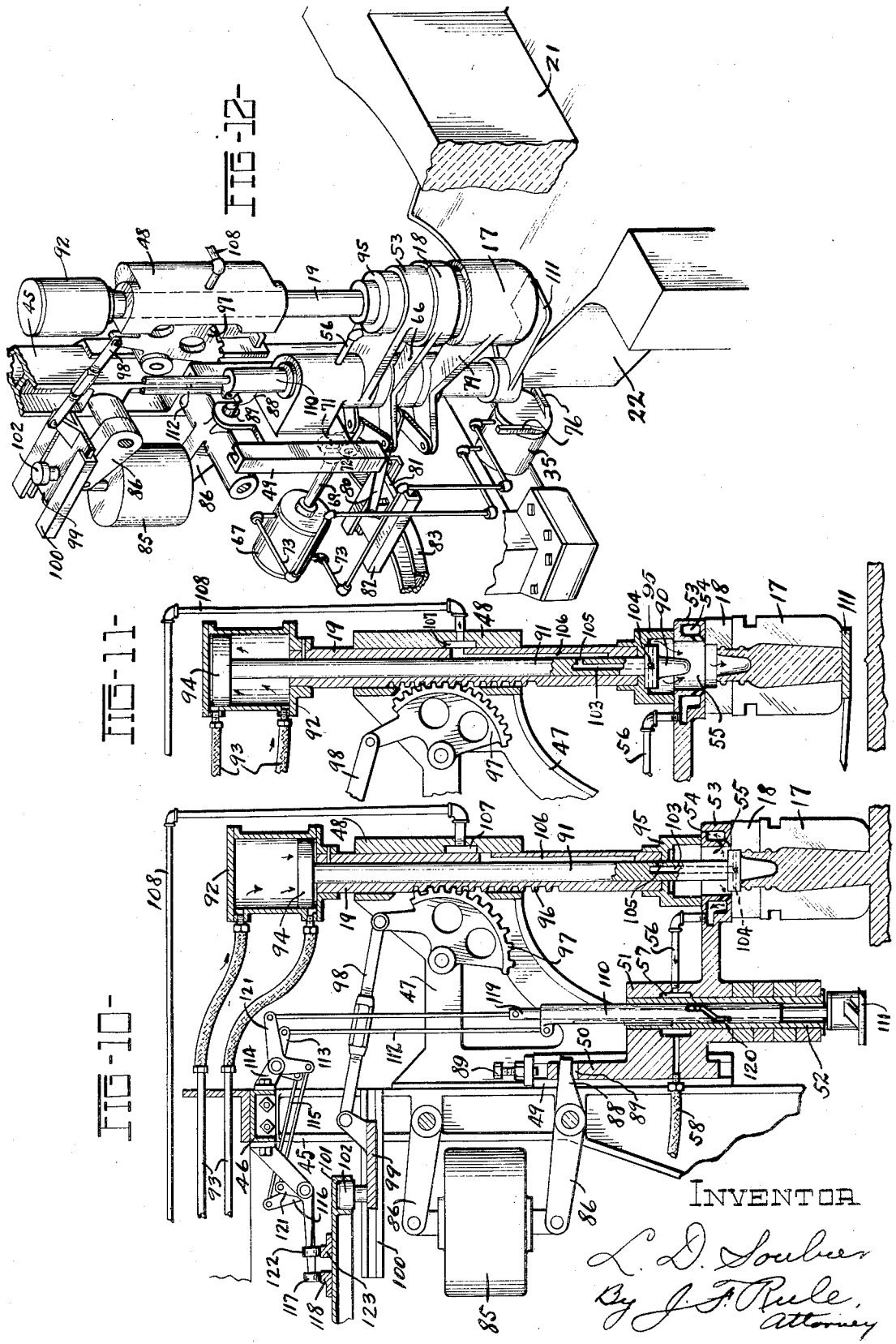

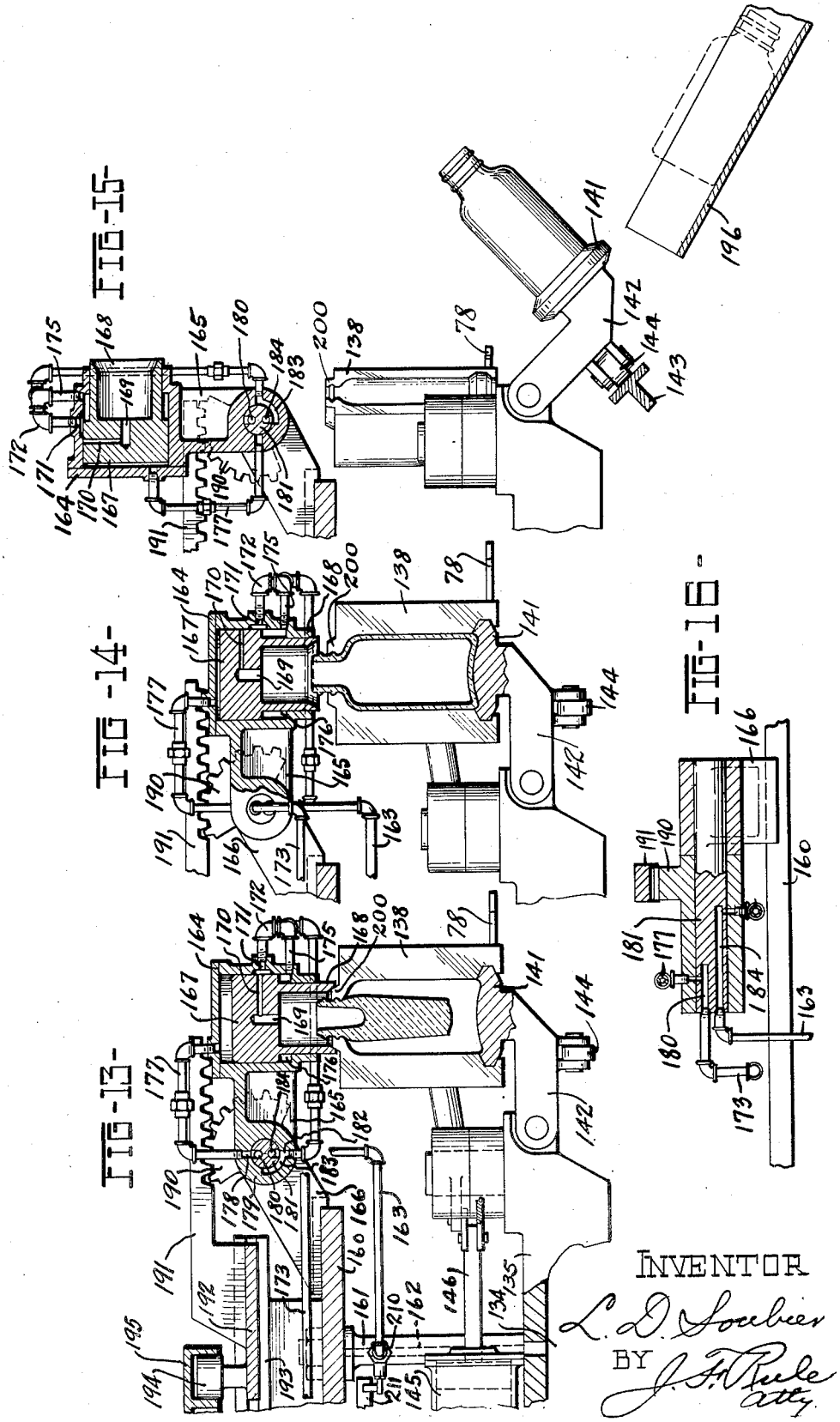

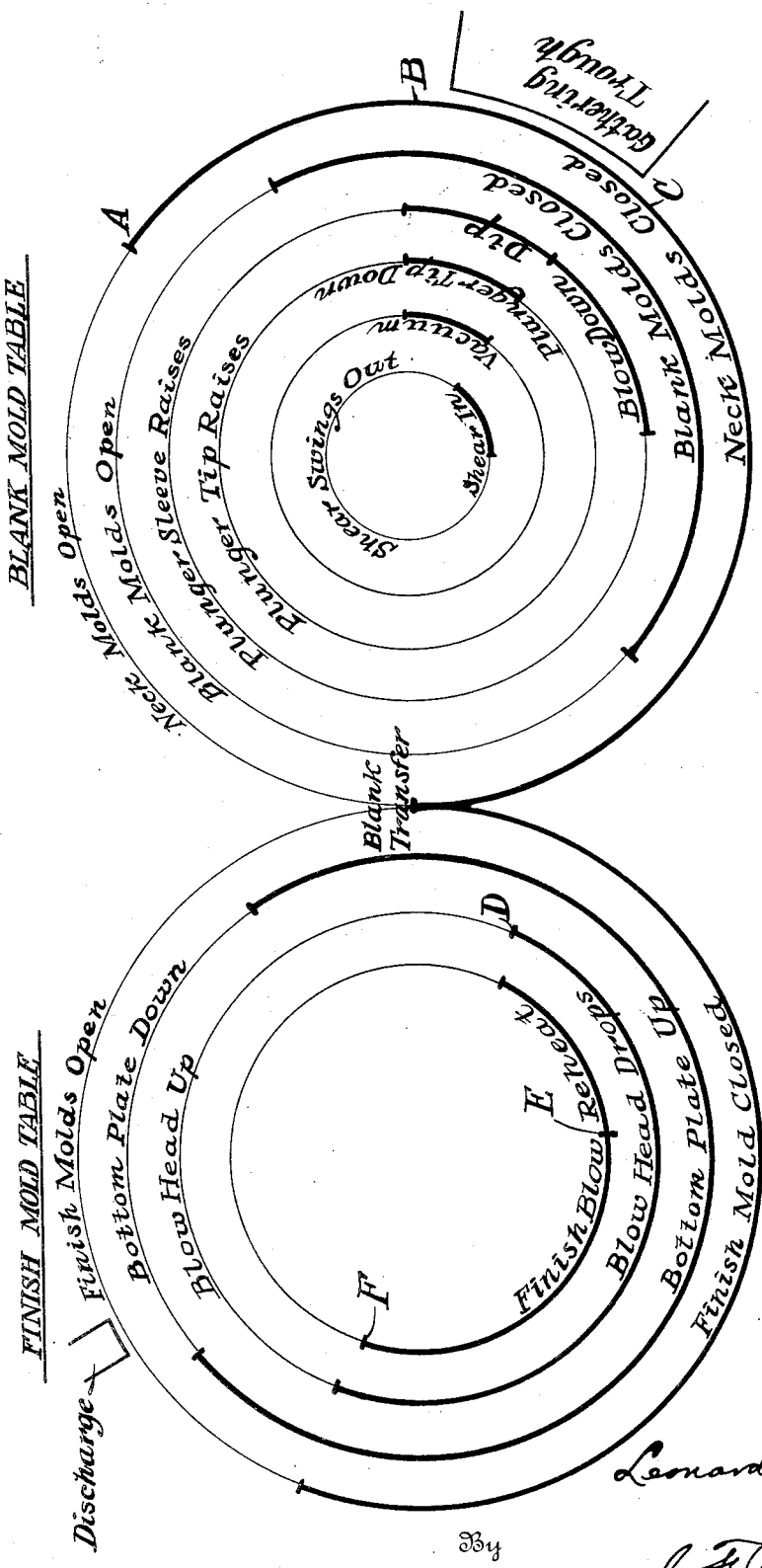

Patented Dec. 8, 1931

1,835,351

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

GLASSWARE FORMING MACHINE

Application filed October 20, 1927. Serial No. 227,384.

The present invention relates to improvements in automatic glassware forming machines and has for an object the general simplification of machine construction and operation and the provision of means for increasing production and improving the quality of ware. To this end, the machine comprises the combination of separate blank and finish mold carriages, the former carrying suction molds which provide for the gathering of glass in the best possible condition for forming parisons, said carriages being given a step-by-step rotary movement during operation thereby.

In the operation of machines of this type, provision is made to momentarily stop movement of the carriages during delivery of charges to the blank molds, compacting of the glass in said molds, and transfer of blanks to the finishing molds. The time required to deliver a charge to a blank mold and blow the glass therein to form a complete parison, is considerably greater than that required to simply transfer a formed parison to a finishing mold. Accordingly, the present invention is designed to eliminate entirely the necessity for stopping the machine to gather charges and merely requires that the machine be stopped periodically for sufficient periods of time to allow transfer of blanks to the finishing molds. To this end, there is provided an annular series of suction molds, one of which is so positioned relative to a supply body of molten glass during each blank transfer operation that immediately upon movement of the blank mold carriage following the blank transfer operation, said mold will move across the surface of the glass and gather its charge therefrom during such movement. Thus, it is seen that the principle embodied in the present invention provides for a material speeding up of machine operation with consequent increased production.

Generally the neck molds are retained about and in contact with the ware during final blowing thereof, with resultant checking or other distortion of the necks. The present invention overcomes this objection by providing for removal of the neck mold and substitution therefor of a final blowing head which encloses but is out of contact with the neck of the ware. A short lapse of time between enclosure of the neck and actual application of blowing air permits reheating of the neck and removal of checks and the like imperfections. Thus, the quality of the ware is materially improved.

Another object of the invention is to provide a charge gathering and parison forming unit of the suction gathering type in which downward movement of the plunger after being projected downwardly into the neck and blank molds, causes the molds to move downwardly therewith into charge gathering contact with a supply body of molten glass. Thus, the mechanism for reciprocating the plunger is utilized to control movement of the blank mold into out of charge gathering position.

A further object of the present invention is to provide a machine including intermittently rotated blank and finish mold carriages arranged side by side, in which the finish molds are equipped with means operating automatically to cause opening of the neck molds substantially simultaneously with closing of the finish molds about parisons at the transfer station. Thus, the mechanism for controlling and timing operations of the transfer of parisons from the parison mold to the finish mold is considerably simplified.

Other objects will be apparent hereinafter.

In the accompanying drawings:

Fig. 1 is a plan view of a machine with parts broken away in section, the blank and finish mold carriages or tables being shown at a standstill to permit transfer of the blank to one of the finish molds.

Fig. 2 is a sectional view taken substantially along the line II—II of Fig. 1.

Fig. 3 is a sectional view along the line III—III of Fig. 2.

Fig. 4 is a fragmentary sectional view along the line IV—IV of Fig. 2, showing the vacuum control valve.

Fig. 5 is a horizontal sectional elevation at the plane of the line V—V of Fig. 2, showing the finish mold operating devices, finish mold bottom plate control cam, and certain other structural details, as well as the driving connections to the motor.

Fig. 6 is a side elevation of the parts shown in Fig. 5.

Fig. 7 is a detail perspective view illustrating one finishing mold unit and a blank or parison about to be enclosed in the finishing mold.

Fig. 8 is a detail view showing the means for operating the valve which controls opening of the blank molds at the transfer station.

Fig. 9 is a view similar to Fig. 8 taken at the mold closing station.

Fig. 10 is a fragmentary sectional view showing the blank mold in charge gathering position, and mechanism for operating the mold.

Fig. 11 is a sectional view showing the blank mold just following closing of its lower end by the cut-off knife and retraction of the bubble forming tip.

Fig. 12 is a detail perspective view showing one of the blank mold groups just after the cut-off knife has been operated.

Fig. 13 is a detail sectional view of the finishing mold just prior to application of pressure to expand the blank.

Fig. 14 is a view similar to Fig. 13, showing the blank expanded to its final form in the finish mold.

Fig. 15 is a view similar to Figs. 13 and 14, showing the article being ejected from the finish mold and the blow head raised away from the finishing mold.

Fig. 16 is a fragmentary longitudinal sectional view of the valved bearing for the final blowing head.

Fig. 17 is a diagrammatic illustration of the cam layout for the two mold carriages.

In the drawings, the machine is shown as comprising a pair of laterally spaced mold carriages or tables mounted upon a wheeled base 20 which provides means permitting movement of the entire machine toward and from a molten glass supply tank 21, the latter formed with a lateral extension 22 designed to expose a gathering area from which charges of molten glass are periodically gathered by suction into the blank molds. The blank mold carriage or table (Fig. 2) includes a circular base member 23 formed with a central axial opening 24 which is aligned with the passageway through an upstanding central supporting pillar 25. This pillar 25 supports a number of cams and other devices which cause actuation of elements of mold units or groups as will be described. The upper end of the pillar 25 is closed by a plate 26 which also supports a distributor head 27 for air pressure supplied to plunger operating air motors and blow heads of the several mold groups. Air pressure is conducted to the distributor head 27 through a supply pipe 29 extending upwardly through the central opening 24 in the base 23 and the passageway through the central pillar 25.

The circular base member 23 (Fig. 2) is formed with an anti-friction ball race between which and a similar race on a rotatable base ring 30 is interposed a series of anti-friction balls 31 or the like. This base ring 30 is formed at its upper end with an annular chamber 32 communicating directly with an air pressure chamber 33 surrounding and spaced from the central opening through the circular base 23 by a dividing wall 34. This chamber 33 (Fig. 2) is directly connected to the air pressure supply pipe 29 so that air pressure may be supplied to the annular chamber 32 in the base ring 30 and thence to an annular series of rotary sleeve valves 35 which are spaced radially outward from said annular chamber 32. These valves (Figs. 1 and 2) control passage of air pressure to air motors which operate the neck molds, as will be pointed out. A ring gear 36 is fixed to the base ring 30 and runs in mesh with a spur gear 37 which is driven by a motor 38 through a train of gears 39 (Figs. 2, 5 and 6). Preferably and according to the illustrated embodiment of the invention, the gearing is such that it intermittently rotates the carriages.

Since the several mold units or groups are identical in construction and operation, the following structural description will be directed to one unit or mold group only. A pair of spaced uprights 45 rise from the rotary base ring 30, having their lower ends bolted or otherwise secured to said ring. The upper ends of these uprights 45 are interconnected by a cross bar 46 (Figs. 1 and 2). A horizontally disposed arm 47 (Figs. 1 and 2) is bolted or otherwise secured to one of the uprights 45 and is formed at its outer end with a vertical bearing 48 in which the plunger sleeve 19 and associated mechanism are mounted as will be apparent. Transversely spaced vertical ways 49 (Fig. 1) are supported by the uprights 45 to guide a slide 50 carrying a vertical bearing 51 through which the mold hinge pin 52 extends.

This bearing (Figs. 10 and 11) in addition to carrying the blank and neck molds 17 and 18, respectively, also rigidly supports a gathering head 53 formed with a vacuum chamber 54 (Figs. 2 and 10) which is spaced outwardly from and concentric with the central opening 55 formed in the gathering head 53 to permit movement of a plunger into and out of the neck mold, as will be pointed out.

This vacuum chamber 54 (Fig. 10) is connected through a pipe 56 to an annular passageway 57 formed in the bearing 51, said passageway being in direct communication with any suitable source of vacuum by way of a flexible pipe 58 and a rigid feed pipe 59, the latter extending downwardly through the central pillar 25. A valved connection (Figs. 2 and 4) between the flexible pipe 58 and the feed pipe 59 is effected by forming a circumferential rib on the outer face of the central pillar 25 and mounting thereon a ring 61 which rotates with the mold carriage, said rib having a longitudinal rib 62 therein in communication with the vacuum pipe 59. As the mold carriage rotates, the pipes 58 are brought in succession into register with the groove 62. Thus, charges of glass are gathered into the blank molds periodically.

A partible neck mold 18 is arranged immediately beneath and for cooperation with the under side of the gathering head 53, and is formed with supporting arms 66 fulcrumed upon the hinge pin 52. An air motor 67 (Fig. 2) is mounted upon a cross bar 68, interconnecting the lower ends of the uprights 45 and has its piston rod 69 connected through links 70 to the arms 66 of the neck mold 18. Since the neck mold is from time to time subject to vertical movement independent of the piston motor 67, as during gathering of charges from the pool 22, the piston rod 69 is enlarged at its outer end and formed with a vertical slot 71 through which a connecting pin 72 extends to form connection between said rod and the links 70. Thus the molds may move vertically independently of the motor 67.

Air pressure is supplied to the motor 67 through the sleeve valve 35 from the pressure chamber 33, there being provided a pair of conduits 73 from opposite ends of the valve to opposite ends of the air motor cylinder. The sleeve valve 35 is formed with a pair of longitudinally spaced ports 74 which are adapted for periodic registration with ports 75 communicating directly with the conduits 73. Rotary movement is imparted to the sleeve valve 35 (Figs. 8 and 9) by a mechanism including the provision of a pair of right angularly disposed tangential fingers 76 at the outer end of the sleeve valve, and the further provision of a trip 77 (Fig. 5) located to strike one of the fingers and position the valve so that air motor 67 will be operated to close the neck mold just prior to arrival at the charge gathering station. Such rotation of the valve to close the neck mold, positions the second finger so that it will be struck by a trip 78 on one of the finish mold halves at the blank transfer station (Fig. 2), causing operation of the air motor 67 and opening of the mold just after the finishing mold has closed.

The blank mold 17 located immediately beneath the neck mold 18 is connected through arms 79 to the vertical hinge pin 52. The arms 79 are connected through suitable links 80 to a slide 81 movable radially of the mold carriage in guideways 82 under influence of a cam 83 and cam roll 84, the former being fixed to the central pillar 25. The cam path is of such form that the blank mold 17 is closed just prior to arrival at the charge gathering station and is opened just in advance of reaching the blank transfer station.

The mold group including the gathering head 53, neck mold 18, and blank mold 17, is normally held out of dipping position by means of a counterweight 85 (Figs. 2 and 12) which is pivoted to parallel arms 86 whose forward ends are hinged upon pins 87 on the uprights 45. One of these arms 86, preferably the lower one, is provided with a forwardly extending finger 88 projecting through an opening formed in the upper end portion of the slide 50 which carries the hinge pin 52. The degree of upward movement of the slide under influence of the counterweight 85 is controlled by an adjustable stop 89 (Fig. 2).

The plunger 90 is mounted on the lower end of a plunger rod 91 extending vertically through the sleeve 19 (Fig. 11), the latter supporting at its upper end an air motor 92 to which air pressure is supplied through suitable conduits 93 from the distributor head 27. The plunger rod 91 extends into the air motor cylinder and mounts therein a piston 94 whose up and down movement causes alternate movement of the plunger 90 into and out of the parison forming molds. The plunger sleeve 19 carries a blowing head 95 at its lower end adapted to seat upon the gathering head 53 during formation of a parison.

To provide for seating of the blowing head 95 upon the gathering head 53 in advance of projection of the plunger 90 into the molds, the plunger sleeve 19 is formed with a series of rack teeth 96 running in mesh with the teeth of a gear segment 97 which is pivoted to the frame extension 47. This gear segment 97 is connected through a rod 98 to a slide 99 movable radially of the mold carriage in guideways 100 under influence of a cam 101 and cam roll 102, the latter being carried by the slide 99. The cam 101 is preferably rigidly mounted upon the central pillar 25. Thus, it is seen that with rotation of this mold group about the central pillar, the slide 99 will be moved outwardly and inwardly in alternation, to reciprocate the plunger sleeve 19 vertically into and out of engagement with the gathering head 53. This downward movement of the plunger sleeve 19 is of such degree that it periodically moves the blank mold into charge gathering contact with the glass. The plunger rod 91 is formed with a relatively short axial passageway 103 at its lower end, said passageway communicating at its lower end with radial openings 104 in the plunger 90, and at its upper end with a radial port 105 which is adapted for communication at times with a longitudinal passageway 106 formed in the plunger sleeve 19. This passageway 106 (Fig. 10) communicates at proper intervals with a chamber 107 to which air pressure is supplied through a conduit 108 from the distributor head 27. These passageways and lateral ports are so positioned with respect to each other that when the blowing head 95 and plunger 90 are in their lowermost positions, flow of air pressure to the blowhead 95 is cut off so that vacuum may be applied to charge the mold with molten glass. Just prior to reaching the next succeeding position (Fig. 11), the vacuum is cut off and the air motor 92 operates to lift the plunger 90 so that the passageways 103 and 106 are brought into communication with each other thereby permitting flow of air pressure downwardly through the plunger 90 to compact the glass forming the parison as hereinafter brought out.

The cut-off mechanism (Fig. 10) which is operated just after a charge has been gathered into a blank mold and as the blank moves away from the supply body of glass, comprises a vertical tube or sleeve 110 extending upwardly through an opening in the hinge pin 52. This tube 110 is supported and periodically reciprocated vertically by a series of bell crank levers and cams (Fig. 10). The support for the tube includes a connecting rod 112 whose upper end is pivoted to a bell crank lever 113 mounted on a bracket 114 extending forwardly from the transverse connecting bar 46 of the mold frame 45. A rod 115 interconnects the bell crank lever 113 and a bell crank lever 116, the latter carrying a cam roll 117 running on a stationary cam 118. The configuration of the cam 118 is such that at regular intervals the bell crank levers will be rocked to thereby alternately raise and lower the tube or sleeve 110. This tube 110 is splined to the hinge pin 52 and has an angular slot and pin connection 120 to a rod 119 which extends through the tube 110 and carries the cut-off knife 111 at its lower end. The angular slot and pin connection 120 between the rod 119 and tube 110, together with vertical reciprocation of the latter causes oscillation of the rod and knife. Vertical movement of the rod 119 is effected by a pair of bell crank levers 121 connected to each other and to the rod 119 by suitable connectors, one of said bell crank levers mounting a cam roll 122 which runs on a stationary cam 123.

From the foregoing, it is seen that in the formation of parisons, the blank mold carriage is rotated in a clockwise direction in a step-by-step manner, and that just before reaching the charge gathering station, the blank and neck mold halves are brought into cooperative engagement with each other and with the gathering head, and the plunger rod and sleeve are lowered as shown in Fig. 10. As the blank mold nears the point at which it is to dip into the glass, the gear segment 97 (Fig. 10) is rocked to overcome the action of the counterweight 85 and effect charge gathering contact between the mold and the molten glass. Upon completion of the charge gathering operation, the mold is lifted away from the glass and the plunger is raised into the blowing head 95 (Fig. 11) to thereby bring the passageways 103 and 106 in the plunger rod 91 and sleeve 19 into communication with each other, whereby air pressure may be applied to the glass in the molds. Thus, the glass is compressed to form a blank just prior to moving the knife 111 away from the blank 17. As the blank mold lifts away from the glass, the cam 123 (Fig. 10) causes movement of the knife 111 to cut off the blank and close the bottom of the mold cavity. At a predetermined station following the gather of a charge, the blowing head 95 and plunger 90 are lifted to the position shown in Fig. 2, such movement permitting the counter-weight 85 to effect further raising of the blank mold. Simultaneously with this additional lifting of the blank mold, the knife 111 is lowered and swung laterally away from the mold. This double movement permits quick separation of the mold and knife with the advantages incident thereto. Upon arrival of the blank mold at the transfer station, the blank or parison is suspended bare from the neck mold. Closing of the finished mold about the bare parison causes the trip 78 on the finish mold to strike a finger 76 on the sleeve valve 35 so that air pressure will be supplied to the air motor 67, which, in turn, opens the neck mold. Thus, the blank is entirely supported by the finish mold and is carried thereby to the blowing and ware ejecting stations. As the blank mold from which the blank has just been removed, again approaches the charge gathering station, the trip 77 (Fig. 5) strikes the other finger 76 of the sleeve valve 35 to thereby operate the air motor 67 and close the neck mold for cooperation with the blank mold 17 and gathering head 53 preparatory to gathering another charge of glass. The series of cams also operate to close the blank mold and again lower the blowing head 95 and plunger 90 for reasons pointed out.

The finish mold unit includes a circular stationary base member 130 supported on a wheeled frame 20.

The base 130 is formed with a upstanding wall 131 spaced inwardly from and concentric with the outer wall of said base and adapted to support a central stationary pillar 130

132. This pillar 132 may be bolted or otherwise connected to the wall 131 (Fig. 2). By spacing the two concentric walls of the base 130, as above stated, an air pressure chamber 133 is formed therein. This chamber communicates directly with an air pressure chamber 134 formed in a rotatable lower section 135 which is free to rotate about the pillar 132 on suitable bearings 136. A ring gear 137 runs in mesh with the gear 37 which is driven through a train of gears by the motor 38 heretofore referred to.

An annular series of finish molds 138 is supported on the section 135 (Fig. 2), each mold comprising a pair of sections having supporting arms 139 pivoted to a hinge pin 140 rising from said base 135. Associated with each mold is a bottom plate 141 fixed to an arm 142 which is hinged to the base 135 for vertical swinging movement. Vertical movement of the bottom plate 141 is controlled by a stationary cam 143 upon which rides a cam roll 144 carried by the arm 142.

Each finish mold is alternately opened and closed at proper intervals by an air motor 145, the piston rod 146 of which is connected through links 147 to the metal supporting arms 139. Constant air pressure is applied to the outer face of the differential piston 148 from the pressure chamber 134 by way of a conduit 149 to thereby hold the finish molds open during a predetermined portion of their travel. Periodically, air pressure is applied to the opposite face of the piston 148 by way of a supply pipe 150, causing the piston to move outwardly and thereby close the blank mold.

Provision is made whereby the finish mold is held closed from the blank transfer station to a point just in advance of the ware ejecting station. An annular rib 151 (Figs. 2 and 3) is formed on the outer face of a central pillar 132 and is formed with an outwardly opening channel 152 closed at one end and communicating at the other end with a supply pipe 150. A relatively short circumferentially extending channel 153 formed in the rib 151 is spaced from the aforementioned channel 152, and functions in a manner to be described. A flanged collar 154 encircles and straddles the rib 151 and is connected by short pipes 155 to the inner ends of the air motor cylinders 145. Thus, it will be seen by reference to Figs. 2 and 3, that upon arrival of the finish mold at the transfer station, the channel 152 and one of the short pipes 155 are brought into communication with each other, permitting supply of air pressure to the air motor 145, to thereby close the finish mold. Just before the finish mold reaches the ware ejecting station, the inlet end of the corresponding pipe 155 passes beyond the channel 152 into register with the short arcuate channel 153 (Fig. 3) above referred to, so that air pressure may be exhausted from the motor 145 to the atmosphere by way of an exhaust port 156. Thus, the finish mold is opened just before it reaches the ware ejecting station.

Blowing heads to blow the blanks to their final form in the finishing molds are spaced above the finish molds 138 on an upper section 160 held in spaced relation to the lower section 135 by standards 161. These standards 161 are formed with axial passageways 162 communicating at their lower ends with the air pressure chamber 134 and at their upper ends with air pressure feed pipes 163 whose function will be brought out presently. Each of the final blowing heads comprises an air motor formed with a downwardly opening cylinder 164 rigidly mounted on an arm 165 journalled for vertical swinging movement upon a bracket 166 extending radially from the table 160 (Figs. 2 and 13). Arranged within the cylinder 164 (Fig. 13) is a differential piston 167 having a depending annular skirt portion 168 which is adapted during the actual final blowing of the blank to seat upon the upper end of the corresponding finish mold 138. The piston 167 is formed with a relatively short axial opening 169 communicating with the space within the skirt 168 and by way of a radial passageway 170 at its upper end with a port 171 which is connected to an air pressure supply pipe 172. This supply pipe 172 is directed radially inward and is connected through a rotary sleeve valve formed in the journal connection between the arm 165 and the bracket 166 to a constant air pressure supply pipe 163 (Figs. 2 and 13). This supply pipe 163 communicates with the air pressure conduits formed in the standards 161 as above described, said conduits opening into the chamber 134. Thus, provision is made for passage of blowing air to the space within the skirt 168 and thence directly into the initial blow opening in the blank. The tapered lower end of the skirt 168 taking over the tapered annular rib 200 prevents accidental opening of the finish mold during blowing of the blank to its final form. A valve 210 in each pipe 163 is held closed by a cam 211 during a predetermined time interval following seating of the skirt on the mold to allow reheating and removal of checks or the like from the necks of the ware.

This pressure, together with pressure supplied through a short pipe extension 175, to an annular chamber 176 surrounding the skirt 168, serves to lift the skirt 168 and piston 167 to the position shown in Fig. 14 upon release of pressure above the piston. The air pressure supply pipe 172 (Fig. 13) opens through a radial port 182 into an arcuate channel 183 which is at all times in direct communication with a longitudinal passageway 184 connected at one end to the pipe 163 leading to the air pressure chamber 134. Thus, while the blowing head is extended radially as shown in Fig. 13, air pressure is supplied through the pipes 172 and 175 to the interior of the cylinder 164 to blow the blank to its final form. The position of the piston shown in Fig. 14, is resumed when the carriage reaches a position to break connection between the pipe 173 and 150 (Fig. 2) and thereby release pressure above the piston 167. Such positioning of the piston as illustrated in Fig. 14, permits constant application of pressure to the lower side of the piston without the skirt 168 so that the skirt is elevated above the finish mold and will not interfere with opening of the latter. Air pressure is periodically supplied through the pipe 173 (Fig. 13) and is admitted to the upper end of the cylinder 164 through a pipe 177. The pipe 177 (Figs. 13 and 16) is connected to a radial port 178 formed in a sleeve 179 at the inner end of the motor supporting arm 165, and provides communication between the upper end of the cylinder and a longitudinal passageway 180 in a shaft 181 carried by the bracket 166. One end of this passageway 180 is directly connected to the pipe 173. By means of a valve connection 174 (Fig. 2) which is substantially identical to the valve 151, flow of air pressure to the pipe 173 is regulated and periodically shut off.

Except during reheating and actual final blowing of the blank, it is desirable to raise the blowing head to a position such as shown in Fig. 15 so that it will not interfere with operation of the blank forming mechanism. Accordingly, a gear segment 190 (Figs. 2 and 13) is fixed to one end of the sleeve 179 and runs in mesh with a rack bar 191 extending radially outward from a slide 192 mounted for radial movement in a pair of guideways 193. This slide 192 carries a cam roll 194 running in the path of the stationary cam 195 whose configuration is such that it swings the blowing head up and down in alternation at proper time intervals.

In operation, the two mold tables are momentarily stopped to transfer a parison to the finishing mold 138. Immediately following this transfer, which includes closing of the finishing mold about the body of the blank by action of the air motor 145 (Fig. 2) and opening of the neck mold to release the blank, the carriages resume their rotative movement. During such rotation, the cam 195 (Figs. 2 and 13) moves the rack bar 191 radially outward to lower the final blowing head to a substantially horizontal position. Continued radial movement brings the pipes 150 and 173 into communication with each other by way of the valve connection 174 (Fig. 2) which, as stated, is similar to that between the pipe 150 and the air motor 145. Thus, air pressure is applied through the upper end of the cylinder 164 to lower the piston 167 and cause seating of the skirt 168 upon the upper end of the finish mold 138.

Such lowering of the piston to seat the skirt brings the radial ports 170 and 171 (Fig. 13) into register with each other so that air pressure from the chamber 134 will be supplied to the space within the skirt and thereby blow the blank to its final form. A portion of this air pressure is introduced into the annular chamber 176 (Fig. 13) for cooperation with the pressure within the skirt in lifting the piston and skirt within the cylinder 164 upon release of pressure above the piston, such release being effected by breaking communication between the air pressure supply pipe 150 and the radial pipe 173 (Fig. 2).

In Fig. 14, the skirt is illustrated as having been raised away from the finishing mold 138 so that the finishing mold may open under influence of the air motor 145. Substantially simultaneously with opening of the finishing mold, the final blowing head is raised to a vertical position by the cam 195 so that it will not interfere with the blank mold mechanism. At the discharge station, a dip in the cam 143 allows the bottom plate 141 to tilt and deposit the blown ware into a chute 196 for transfer to a conveyor or the like (not shown).

In Fig. 17, I have illustrated the approximate sequence of the operations taking place in the formation of an article. This figure should be considered along with Figure 2 for a full understanding of the operations. The blank and finish mold carriages are rotated in a step-by-step fashion about their axes. Considering one mold unit, the neck mold 18 (Fig. 2), closes at station "A", which is two stations in advance of the charge gathering station, further movement of the blank mold carriage causes the cam 83 (Fig. 2) to close the blank mold 17 to a position in which it cooperates with the neck mold and gathering head. The mold unit again comes to a standstill at station "B" substantially over the rim of the gathering pot 22 for a period of time permitting transfer of a blank from a preceding blank mold to a finishing mold at the blank transfer station. Upon completion of the blank transfer, the carriage is given another partial rotation, causing movement of the blank mold over the gathering pot to station "C" beyond the pot where it is again momentarily stopped. Substantially simultaneously with initial movement of the mold over the molten glass away from station "B", the plunger 90 and blow head 95 (Fig. 2) are moved downward for cooperation with the neck mold 18. Just as the mold passes inwardly beyond the rim of the gathering pot, the plunger tip is moved further downward into the neck mold and upper end of the blank mold, and the blow head is moved further downward to cause the blank mold to dip into the molten glass. During the period of contact of the mold with the glass, vacuum is applied through the gathering head 53 (Fig. 2) to draw a charge of glass into the blank mold. Immediately following gathering of the charge, the shear 111 is moved inwardly by the cams 118 and 123 (Fig. 10) to cut the string of glass from the mold charge and to close the bottom of the mold cavity, it being understood by reference to the diagram shown in Fig. 17 that the mold unit raises at the end of the dip or charge gathering period just prior to said inward movement of the shear. Simultaneously with closing of the blank mold cavity by the shear, air pressure is applied downwardly to the charge of glass to compact the same in the blank mold. Preferably, this blow-down continues for a period corresponding to that during which the shear closes the bottom of the blank mold cavity. The blow-down is then terminated and the shear 111 is lowered away from the blank mold 17 after which the blank mold is opened, leaving the bare blank suspended from the neck mold for movement to the blank transfer station.

A finish mold on the finish mold table closes about the bare parison at the transfer station and by means of a finger 78 (Fig. 2) trips a device which opens the neck mold, leaving the neck portion of the parison extending bare above the finish mold. Just prior to reaching the blank transfer station, the bottom plate 141 is raised by the cam 143 (Fig. 2) to a position for cooperation with the finish mold 138. At station "D", the final blow head is swung downwardly by a cam 195 to enclose the neck portion of the blank. From station "D" to station "E", the neck and body portions of the blank are reheated for the purpose of removing checks and other similar imperfections. Immediately following termination of the reheat period at station "E", the finish or final blow is started and continued substantially to station "F" where the valve arrangement shown in Fig. 3, operates to shut off the supply of blowing air to the blow head, and the cam 195 (Fig. 2) operates to swing the blow head upwardly. Immediately following initial upward movement of the finish blow head, the finish mold 138 opens, such opening being followed at the ware ejecting station by downward tilting of the bottom plate which causes deposit of the finished article onto a chute 196 or the like.

From the foregoing, the steps followed in producing an article on the machine herein disclosed, are readily understood.

Modifications may be resorted to within the spirit and scope of the appended claims.

What I claim is:

1. In a machine for forming glassware, a frame, a blank mold unit slidable vertically on said frame, said unit including a blank mold, neck mold and gathering head, means normally yieldingly holding the elements of said unit in their uppermost position, a plunger and blow head reciprocable into and out of cooperative engagement with said elements, and means operable at intervals to cause such downward movement of the plunger and blow head that the blank mold is moved downwardly to a charge gathering position.

2. In a glassware forming machine, the combination of a blank mold adapted to gather charges by suction, means normally holding the mold above a charge gathering plane, a plunger and blow head reciprocable into and out of cooperative relation to said mold, and automatic means to so move the plunger and blowing head that they move the blank mold downwardly at intervals to the charge gathering plane.

3. In a glassware forming machine, the combination of a blank mold adapted to gather charges by suction, means normally holding the mold above a charge gathering plane, a plunger and blow head reciprocable into and out of cooperative relation to said mold, and a cam controlled rack and pinion mechanism causing periodic downward movement of the plunger and blowing head to an extent to move the blank mold downwardly into charge gathering contact with a body of molten glass.

4. In a glassware forming machine, the combination of a blank mold adapted to gather charges by suction, means to alternately raise and lower said blank mold, a cut-off knife movable across the bottom of the blank mold at intervals to sever the charges and close the blank mold cavity, means to lower the cut-off knife away from the blank mold at a predetermined station, and means to move the blank mold upwardly simultaneously with the lowering of the cut-off knife.

5. In a glassware forming machine, the combination of a rotatable mold carriage, an annular series of frames thereon, a vertically movable slide on each frame, a blank mold, neck mold and gathering head on each slide, yieldable means to elevate the slide and elements carried thereby and normally hold them in their uppermost position, means movable periodically into cooperative relation to said elements to close the upper end of the blank mold cavity, and automatic mechanism to effect such downward movement of the cavity closing means that the blank mold may be moved downwardly at intervals into charge gathering contact with a supply body of molten glass under direct influence of said cavity closing means.

6. In a glassware forming machine, the combination of a rotatable mold carriage, an annular series of frames thereon, a vertically movable slide on each frame, a blank mold neck mold and gathering head on each slide, yieldable means to elevate the slide and elements carried thereby and normally hold them in their uppermost position, means movable periodically into cooperative relation to said elements to close the upper end of the blank mold cavity, and automatic mechanism to effect such downward movement of the cavity closing means that the blank mold may be moved downwardly at intervals into charge gathering contact with a supply body of molten glass under direct influence of said cavity closing means, the elevating means for the slide, blank mold, neck mold and gathering head, comprising a counterweight hinged to said frame and operatively connected to the slide.

7. In a glassware forming machine, the combination of an annular series of suction blank molds rotatable about a vertical axis, an annular series of finishing molds rotatable about a vertical axis spaced laterally from the blank molds, blow heads and plungers movable into cooperative relation with the blank molds at intervals, means to so move the plungers and blow heads that the blank molds are moved downwardly thereby at intervals into a charge gathering position, means to transfer blanks to the finishing molds, and means to blow the blanks to their final form in said finishing molds.

8. In a glassware forming machine, the combination of an annular series of suction blank molds rotatable about a vertical axis, an annular series of finishing molds rotatable about a vertical axis spaced laterally from the blank molds, blow heads and plungers movable into cooperative relation with the blank molds at intervals, means to so move the plungers and blow heads that the blank molds are moved downwardly thereby at intervals into a charge gathering position, means to transfer blanks to the finishing molds, means to blow the blanks to their final form in said finishing molds, and yieldable means operating automatically upon movement of the plungers and blowing heads out of cooperative relation with the blank molds, to move the latter vertically.

9. In a glassware forming machine, the combination of an annular series of suction blank molds rotatable about a vertical axis, an annular series of finishing molds rotatable about a vertical axis spaced laterally from the blank molds, blow heads and plungers movable into cooperative relation with the blank molds at intervals, means to so move the plungers and blow heads that the blank molds are moved downwardly thereby at intervals into a charge gathering position, means to transfer blanks to the finishing molds, means to blow the blanks to their final form in said finishing molds, yieldable means operating automatically upon movement of the plungers and blowing heads out of cooperative relation with the blank molds, to move the latter vertically, and adjustable means to regulate the degree of upward movement of the blank molds.

10. In a machine for forming glass articles, the combination of a rotary mold carriage, an annular series of finishing molds thereon, blowing heads individual to the molds, means for enclosing parisons in said molds with the neck portions of the parisons protruding, means for positioning the blowing heads to enclose said protruding neck portions and causing said neck portions to reheat during a predetermined time interval while thus enclosed, and means operable following said reheating interval to apply blowing air to the interior of the parisons, said last mentioned means including valve mechanism operable independently of said positioning of the blowing heads.

11. In a machine for forming glass articles, the combination of an annular series of finishing molds, means for rotating the molds about a vertical axis, means for enclosing parisons in said molds with the neck portions of the parisons protruding beyond the molds, means for enclosing said protruding neck portions during predetermined time intervals while the molds are rotating and thereby causing reheating of said neck portions, and means brought into operation at the terminations of said reheating periods for blowing the parisons to their final form in the molds.

12. In a machine for forming glass articles, the combination of a blank mold, means for intermittently revolving said mold about a vertical axis, a finishing mold, means for intermittently revolving the finishing mold about a vertical axis spaced laterally from said first mentioned axis, means operated by movement of the blank mold in one portion of its path of travel for introducing a charge of glass by suction into the blank mold, and means for transferring the parison from the blank mold to the finishing mold for final shaping.

13. In a glassware forming machine, an annular series of blank molds rotatable about a vertical axis, means for intermittently imparting rotary movement to said series of molds, means operated by movement of the molds in one portion of their path of travel to deliver mold charges of molten glass to the molds, means for transforming the mold charges into blanks, and means for expanding the blanks to their final shapes.

14. In a glassware forming machine, an annular series of blank molds rotatable about a vertical axis, means for intermittently imparting rotary movement to said series of molds means operated by movement of the molds in one portion of their path of travel to exhaust air from mold cavities and fill the latter with molten glass, means for transforming the glass into blanks, and means for expanding the blanks to their final shapes.

15. In a glassware forming machine, an annular series of blank molds rotatable about a vertical axis, means for intermittently imparting rotary movement to said series of molds, means for lowering the blank molds one at a time at a charging station, means operated by movement of the molds in one portion of their path of travel to exhaust air from the mold cavities to thereby deliver mold charges of molten glass to the molds at said charging station, means for transforming the mold charges into blanks, and means for expanding the blanks to their final shapes.

Signed at Toledo, in the county of Lucas and State of Ohio, this 17th day of October, 1927.

LEONARD D. SOUBIER.